United States Patent [19]

Shu et al.

[11] Patent Number: 5,050,021
[45] Date of Patent: Sep. 17, 1991

[54] EXPANDED MICRO CASSETTE PLAYER-RECORDER

[75] Inventors: Stephen K. Shu, Fountain Valley; John A. Rawson, Orange; Robert C. Beauchamp, Westminster, all of Calif.

[73] Assignee: Del Mar Avionics, Irvine, Calif.

[21] Appl. No.: 495,034

[22] Filed: Mar. 16, 1990

[51] Int. Cl.⁵ .............................................. G11B 5/11
[52] U.S. Cl. ...................................... 360/95; 360/128
[58] Field of Search ............... 360/95, 85, 96.5, 128

[56] References Cited

U.S. PATENT DOCUMENTS

| | | | |
|---|---|---|---|
| 3,612,539 | 10/1971 | Bragas et al. | 360/95 X |
| 3,752,415 | 8/1973 | Sleger | 360/95 X |
| 3,860,960 | 1/1975 | Akamine | 360/95 X |
| 3,871,025 | 3/1975 | Nakamoto | 360/95 X |
| 3,940,791 | 2/1976 | Kayan | 360/95 |
| 4,633,352 | 12/1986 | Mizoguchi et al. | 360/128 X |
| 4,816,950 | 3/1989 | Heinz et al. | 360/95 X |

FOREIGN PATENT DOCUMENTS 52-60108 5/1977 Japan ...................................... 360/95
52-76007 6/1977 Japan ...................................... 360/95

Primary Examiner—John H. Wolff
Attorney, Agent, or Firm—W. D. English; J. D. Leimbach

[57] ABSTRACT

A micro cassette recorder-player is disclsoed having capacity for increased signal-to-noise ratio by utilizing a mobile capstan which pulls tape out of a micro cassette and across an enlarged head placed distal to and shielded from all electric motors, solenoids, and inductors which typically create spurious electric and magentic flux fields that traditionally diminish S/N.

3 Claims, 1 Drawing Sheet

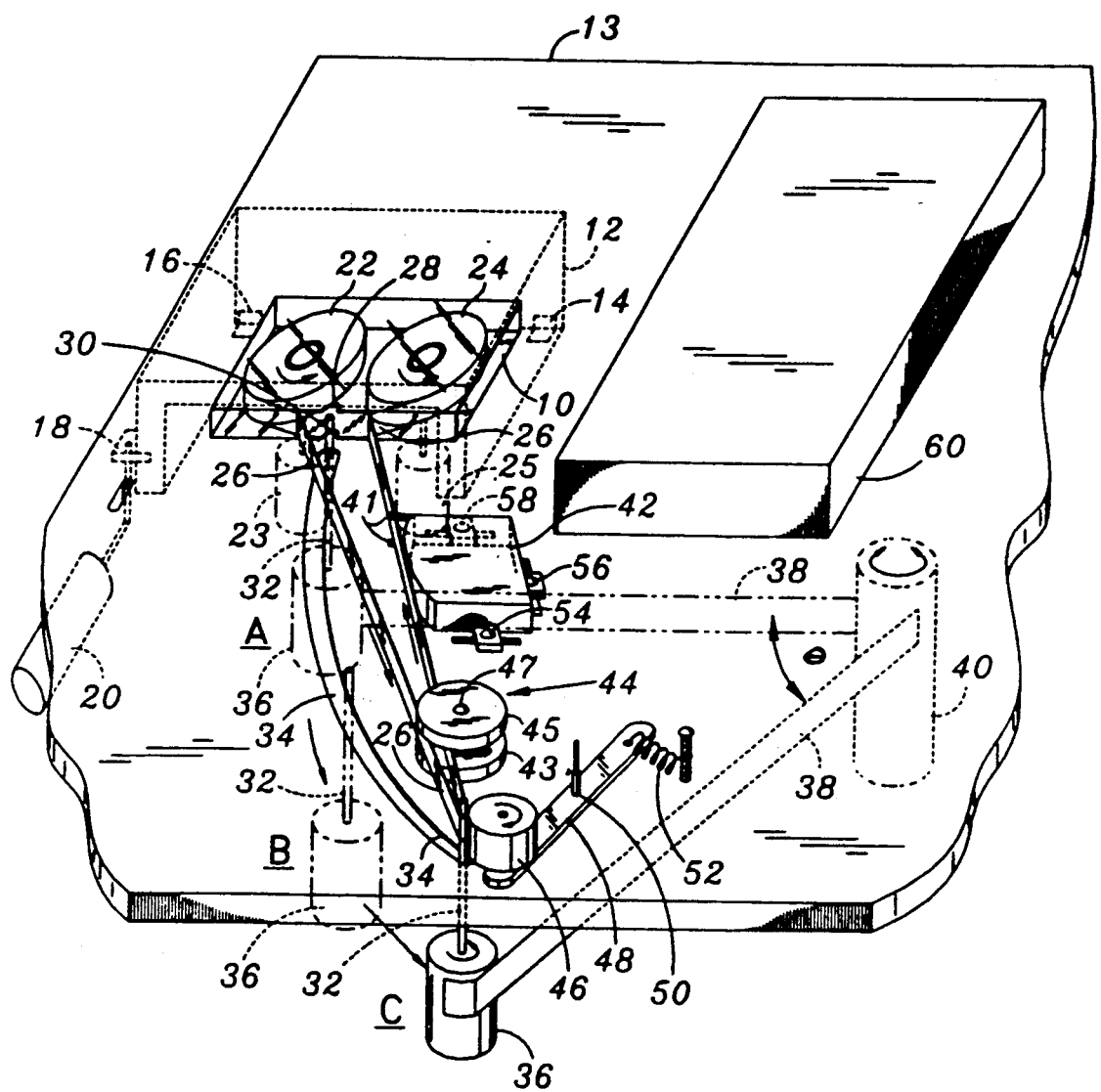

EXPANDED MICRO CASSETTE PLAYER-RECORDER

BACKGROUND OF THE INVENTION

1. Field of the Invention

The invention relates to tape recording and reproducing apparatus and particularly to such apparatus which customarily uses very small, micro cassettes in applications where relatively low frequency recordings and very slow moving tape require a relatively large playback/reproducing head for increased signal to noise (S/N) ratio.

2. Description of the Prior Art

Prior art magnetic tape recorder-players have progressed from relatively large reel-to-reel tapes, to 8-track cartridges and conventional cassettes, to the most recent micro or miniature tape cassettes. Prior to the introduction of the micro cassette, the relatively large size of tape reels necessitated that the tape recording or playing head be relatively distant from all electric motors conventionally used in tape decks; i.e. reel drive motors, pinch roller and capstan drive motor, and other electric motors or solenoids typically used in recorder-players. In such systems, there was limited concern for electrical or magnetic flux field interference with the head reading/recording functions due to the inherent relatively large separation of the head from all electric motors disposed within or around the recorder-player system.

However, with the advent of micro and miniature cassettes, and in particular in consideration of specialized very slow moving tape applications for relatively long record and play periods, combined with very high amplification required for the slow moving tape to adequately replay the recording, and the need to record relatively low frequency signals, existing tape deck systems do encounter increased noise and decreased signal to noise (S/N) ratio due to decreased signal sensitivity and due to proximity of various electric motors, i.e. reel motors, capstan motor and other operating motors, inductors or solenoids, all contributing in a significant manner to electric or magnetic flux interference with the head reading from or writing to a magnetic tape.

Generally speaking, in the reproducing, the magnetization of the tape produces flux in the core of the playback head, and as this flux changes, a voltage is induced in the head windings. The output voltage from the playback head is proportional to the rate of change of flux and number of wire turns the flux field lines cut through.

$$V = N \frac{d\phi}{dt}$$

For a given degree of peak magnetization of the tape, corresponding to a particular value of alternating recording current, the peak flux in the playback head will be constant. The rate of change of flux, however, which determine the magnitude of the playback-head voltage output, will depend upon the rate of change of recording current as well as its magnitude. Therefore, if we record a varying frequency sine wave with recording current held constant regardless of frequency, the playback voltage will increase linearly with frequency. The slope of the playback voltage curve, is proportion linerly with frequency over a portion of the usable frequency range (6 db per active slope). At both very low and very high frequency the system frequency characteristic departs from this 6 db per active slope.

For low frequency response the playback heads have a maximum wave/length or minimum low frequency response, sometimes called "contour effect." The low frequency cut off is determined by three factors: 1. Length of the pole across the head face; 2. Length of the face window; and 3. Shape of lamination behind head face. All these three factors are related to the size of the head.

By moving the head out and away from the micro cassette, the present invention solves several of the foregoing, existing prior art problems. Since the head is not conventionally within the confines of the micro cassette, the head size (L) can be increased (lengthened) thereby allowing an increase in the number of wire turns (N) thereby increasing inductance ($\phi$) capability and rate of change of inductance ($d\phi/dt$) which, of course, increases the signal (V).

In addition by moving the head distal to the tape reel motors as well as the pinch roller/capstan motor and by placing a relatively thick metal plate between the head and all electric motors and solenoids, less electrical and magnetic flux interference is encountered.

Furthermore, by wrapping the tape around the capstan, in a "U" shaped manner in the present invention as opposed to conventional tangentially touching the tape, greater tape traction is achieved with the capstan alone and therefore necessarily less capstan pressure is needed and in some cases the need for a pinch roller to apply pressure to the tape against the capstan is totally eliminated; less pressure, of course, yields less tape distortion (stretching), less tape wear and tear, less drive motor power, and correspondingly longer tape life and longer motor life.

Of equal import, is the fact that a better tape guide and tape speed control is achieved by pulling the tape out from the micro cassette past a pair of initial tape guides, across a larger head and through a large and easily positioned bidirectional tape guide.

Still another benefit achieved in the present invention is that but one tape guide is necessary to confine tape travel in two directions at a distance from the cassette, thereby eliminating excessive and needless components and further minimizing excessive tape edge wear and tear.

In addition, because the head is distal to the tape cassette/cartridge, the head can be adjusted and reoriented in three planes, zenith, azimuth and head penetration to obtain optimal signal to noise ratio thereby eliminating recording channel skew and achieving desired orientation or wrap angle of tape contact with the head.

It should also be noted that while it is common practice in the present art in tape recorders and tape playback decks to drive the tape between two tape reels past one or more magnetic heads by using a motorized capstan with a pinch roller pressing the tape against a metalic cylindrical surface of the driven capstan, so also is it common practice to utilize a frictional surface such as rubber on the cylindrical surface of the capstan to drive the tape without the use of a pinch roller by arranging an angular wrap in approach and departure of the tape from the capstan, letting tape tension and friction assist the driving force from the capstan in moving the tape.

OBJECTS OF THE INVENTION

It is therefore a principal object of the invention to make a more efficient and improved magnetic tape player-recorder for micro cassette tape applications.

A further object of the invention is to increase sensitivity of a micro cassette player-recorder by incorporating a larger than conventional recording/playback head to effectively increase the active area of said head, by permitting a greater number of wire turns, which thereby increases inductance capability and therefore sensitivity of said head.

Yet another object of the invention is to eliminate or substantially attenuate electric motor magnetic flux and electrical field interference by positioning the playing-/recording head distant from all electric motors in a player-recorder conventionally used to drive tape reels, to maintain a desired tape tauntness, and to drive the capstan and pinch roller, which propels and regulates tape flow.

Still a further object of the invention is to maintain a desired tape tension over said capstan by varying current individually to either of said tape reel drive (torque) motors.

Still another object of the invention is to improve tape guidance by incorporating a tape guide having capability to guide flow of at least two strands of tape flowing in opposite directions.

Yet a further object of the invention is to incorporate means for periodically adjusting said head in at least three directions, zenith, azimuth and depth.

Yet a further object of the invention is to provide a player/recorder having means for greater tape speed control and longer tape life due to approximately 180° tape wrap around capstan thereby requiring less pinch roller/capstan pressure, and therefore causing less tape compression and distortion.

SUMMARY OF THE INVENTION

The invention is a micro cassette player-recorder which utilizes a traveling capstan that engages the cassette enclosed magnetic tape from behind upon insertion of the cassette into the player-recorder. On activation of the recorder, the capstan is caused to move outwardly from the cassette along a slot in a thick metal plate pulling and extending the tape past a pair of tape guides out and across an enlarged recorder head positioned distal to the cassette and through a bidirectional tape guide to engage the tape and capstan with a spring balanced pinch wheel distal to the head. The invention further conceives placing the head on one side of a metal plate at a position distal to all electric motors and solenoids, which motors and solenoids are also positioned on the opposite side of the metal plate which acts as a electric field and magnetic flux barrier.

DESCRIPTION OF THE DRAWING

The figure is an isometric view of the invention illustrating a mobile capstan and various hidden motors and solenoids.

DESCRIPTION OF A PREFERRED EMBODIMENT

Referring to the drawing, the figure illustrates a micro cassette 10 situated within a housing 12 upon a thick, metal baseplate 13. Baseplate 13 serves as an electrical field and magnetic flux barrier. Housing 12 is caused to lift open as desired for insertion and extraction of cassette 10 along tracks 11 and 13 by rotation of housing 12 upon a pair of spring hinges 14 and 16 when a locking element 18 is operated upon and thereby disengaged from housing 12 by a locking solenoid 20 positioned below baseplate 13. Positioning pins 6 and 8 as well as activation switch 7 hold cassette 10 fixedly but spring mounted and suspended within housing 12 for secure and accurate repeatable positioning of the cassette. It should be understood that housing 12 is drawn with imaginary lines in the figure only for purposes of clearly illustrating cassette 10 and respective components therein.

Micro cassette 10 may be any cassette typically available in the market conventionally consisting of a transparent or opaque plastic body enclosing a first and second, tape feed (supply) and tape take up, reels 22 and 24 which are driven by a first and second reel motors 23 and 25, respectively. Motors 23 and 25 are also positioned below plate 13. Reels 22 and 24 are conventionally loaded with and coupled by a continuum of tape 26. However, such conventional cassettes must be modified for application to this invention by cutting out a first and second capstan notches or ports 28 and 30 for insertion therethrough of a first and second tape guides 2 and 4 and a capstan 32 which passes through a curved slot 34 in metal baseplate 13 and behind tape 26 to a capstan motor 36. Motor 36 is also positioned below baseplate 13.

Capstan motor 36 is coupled by a swinging arm 38 to a rotating capstan position motor and gearhead 40, positioned below metal plate 13, and which causes motor 36 and respective capstan 32 to traverse along slot 34 from position A, on insertion of cassette 10 into housing 12 and activation of the system, through position B to position C all the while carrying a loop of tape 26 in its traverse out of cassette 10 across an enlarged recording/playback head 42 at a desired wrap angle, through a bidirectional tape guide 44 to a pinch roller 46 which compresses tape 26 upon capstan 32 by flexible implementation of a lever arm 48 rotated about a fulcrum 50 by spring means 52.

On deactivation of the recorder-player capstan position motor 40 automatically reverses direction and position arm 38 carries capstan motor 36 and respective capstan 32 together with tape 26 back along slot 34 from position C through B to position A, at which point tape 26 is back within cassette 10.

It will be apparent from the drawing that slot 34 is curved and in fact is an arc of a circle subtended by an angle $\theta$ bounded by the two extreme radii positions, A & C, in the angular movement of solenoid arm 38. By such means and movement capstan 32 is enabled to draw tape 26 out of micro cassette 12 and in a slight bending manner firmly apply the tape surface flatly against the surface of a relatively large head 42 and assure tight contact therebetween. In order to obtain maximum desirable tape contact with the head, three head adjusting elements 54, 56 and 58, movable along adjustment slots on three sides of head 42, are provided to permit movable setting of the head in three directions to include zenith, azimuth and depth. It will be observed that by such design and placement of the head, the signal to noise ratio is not only increased by the ability to substantially increase flux density across the head by increasing head size, and thereby the number of inductive coils therein, but also permits placement of the head distal to all electric motors as well as on the opposite side of a thick metal plate barrier to all electric motors.

A pair of reel tape guides 2 and 4, a pair of head tape guides 41 & 43, and a bidirectional tape guide 44 further establishes proper tracking of tape from reel to reel and across the head. Bidirectional tape guide 44 may consist of a plastic or metal upper and lower discs 43 and 45 fixedly coupled together in parallel by a spindle 47 and are separated by a gap approximately equal to the width of tape 26 such that the tape may flow freely in both directions therethrough. Therefor, in addition to enable proper tape tracking across head 42, bidirectional tape guide prevents undesirable creep, up or down, of tape 26 on capstan 32 in its traverse out of the cassette and further assures that the tape will wrap around the capstan in a "U" shape thereby making maximum surface area contact of the tape on the cassette. With maximum surface contact of the tape around the capstan, less pressure need be applied by pinch wheel 46 on tape 26 to capstan 32 thereby diminishing distortion of the tape and increasing accuracy of tape flow as well as lengthening tape life.

Although not illustrated in the figure, it is within the contemplation of this disclosure that both pinch roller 46 and bidirectional tape guide 44 are desirable aspects and features of a preferred embodiment, but may also be unnecessary to the invention concept.

If, for example, capstan shaft 32 were surrounded with a soft pliable rubber coating, tape to shaft friction could be incurred sufficient to propel tape 26 without need for pressure normally applied by pinch roller 46.

It should be understood that rectangular box 60 is provided in the figure only to indicate presence and position of a conventional recorder printed circuit board comprising numerous electronic components configured thereon.

Although there has been described hereinabove a particular arrangement of components in a micro cassette player-recorder for the purpose of illustrating the manner in which the invention may be used to advantage, it will be appreciated that the invention is not limited thereto. Accordingly any and all modifications, variations, or equivalent arrangements which may occur to one skilled in the art should be considered to be with the scope and spirit of the invention as more particularly delineated in the appended claims.

What is claimed is:

1. A magnetic tape cassette player-recorder, comprising:
   means for housing a cassette;
   a recorder head disposed distal to said cassette housing means;
   insulation means to insulate said head from magnetic flux fields;
   extraction means for pulling a loop of said tape out of said cassette and across said head, said extraction means including a single capstan that fits within a single capstan port within said cassette;
   motorized means for propelling and accurately guiding said extracting means, said motorized means being attached to said capstan through a slot in said insulation means such that said capstan of the extracting means powered by said motorized means will take said loop of said tape and hold said tape across said head.

2. In a tape recorder-player of the class employing a tape cassette wherein magnetic tape is pulled across tape guides and over a recording head distal said cassette from a motorized feed reel to a motorized take up reel by a motorized capstan-pinch roller means more distal said cassette than said recording head, the combination with said recorder-player of:
   locating said pinch roller to a point distal to said cassette;
   providing means for moving said motorized capstan, for wrapping tape thereon, and for carrying said tape out of said cassette to said pinch roller for yielding a pulled out tape segment;
   positioning a recorder head distal to all motors and tangential to said pulled out tape segment while employing means for taut positioning to hold said tape segment taut against said recorder head, said means for taut positioning consisting of a single tape guide positioned such that a single capstan can place said pulled out tape segment against said recorder head in a taut position; and
   providing electromagnetic barrier means disposed between said head and all motors.

3. A tape cassette player-recorder, comprising:
   a baseplate forming an electromagnetic barrier having first and second planar surfaces with an elongated curved slot therethrough with near and distal ends;
   a cassette seat disposed on said first surface of said barrier having first and second reel motors positioned on said second surface of said barrier at said near end of said slot;
   a single pinch roller disposed at said distal end of said slot;
   a recorder head disposed on said first surface of said barrier tangential to and at a point between said near and distal ends of said slot;
   a bidirectional tape guide disposed at a point between said recorder head and said pinch roller, said bidirectional tape guide including an upper disc and a lower disc fixedly coupled together by a spindle, said spindle creating a space between said upper disc and said lower disc through which cassette tape may flow freely;
   a single movable capstan shaft extending through and movable along said slot, having a capstan tape drive motor positioned on said second surface of said barrier;
   means for engaging said capstan shaft with tape within a cassette placed in said seat; and
   means for moving said tape engaged capstan shaft along said slot thereby pulling said tape out along said slot, causing said tape to tautly engage the read/write surface of said recorder head by passing through said space within said bidirectional tape guide to engage said capstan shaft and accompanying tape with said pinch roller.

* * * * *